(12) United States Patent
Maity et al.

(10) Patent No.: US 12,276,609 B2
(45) Date of Patent: Apr. 15, 2025

(54) FLUORESCENCE SPECTROSCOPY FOR ESTIMATION OF FLUID CONTAMINATION

(71) Applicants: Sandip Maity, Manama (BH); Ansgar Cartellieri, Lower Saxony (DE)

(72) Inventors: Sandip Maity, Manama (BH); Ansgar Cartellieri, Lower Saxony (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 236 days.

(21) Appl. No.: 17/888,578

(22) Filed: Aug. 16, 2022

(65) Prior Publication Data
US 2024/0060889 A1 Feb. 22, 2024

(51) Int. Cl.
G01N 21/64 (2006.01)
G01N 1/14 (2006.01)
G01N 21/88 (2006.01)

(52) U.S. Cl.
CPC .............. *G01N 21/64* (2013.01); *G01N 1/14* (2013.01); *G01N 21/88* (2013.01)

(58) Field of Classification Search
CPC ......... G01N 21/64; G01N 21/88; E21B 49/08
See application file for complete search history.

(56) References Cited

U.S. PATENT DOCUMENTS

| | | | |
|---|---|---|---|
| 5,780,850 A | 7/1998 | Delaune et al. | |
| 6,178,815 B1 * | 1/2001 | Felling | E21B 49/10 73/152.19 |
| 8,045,154 B2 | 10/2011 | Hegazi | |
| 8,204,579 B2 | 6/2012 | Nielsen et al. | |
| 11,028,988 B2 | 6/2021 | Yamanaka et al. | |

(Continued)

FOREIGN PATENT DOCUMENTS

| | | |
|---|---|---|
| CN | 102711068 A | 9/2008 |
| | 101271068 | |
| CN | 102711068 A | 9/2008 |
| CN | 107290291 A | 10/2017 |

OTHER PUBLICATIONS

Cartellieri et al. "New optical sensor system for improved fluid identification and fluid typing during LWD sampling operations", SPE/IADC Drilling Conference and Exhibition, Mar. 14, 2017, pp. 1-18.

(Continued)

*Primary Examiner* — Dani Fox
*Assistant Examiner* — Casey Bryant
(74) *Attorney, Agent, or Firm* — CANTOR COLBURN LLP

(57) ABSTRACT

A method of analyzing a fluid includes acquiring a sample of the fluid extracted from a subterranean region proximate to a borehole, the borehole including an injected fluid, applying light having a first excitation wavelength to the fluid sample, and measuring a first fluorescence spectrum. The method also includes comparing the first fluorescence spectrum to a reference fluorescence spectrum corresponding to a fluid having injected fluid contamination and/or to a second fluorescence spectrum based on applying light having a second excitation wavelength to the fluid sample. The method further includes estimating a level of contamination of the fluid sample with the injected fluid based on the comparing.

18 Claims, 6 Drawing Sheets

(56) References Cited

U.S. PATENT DOCUMENTS

| | | |
|---|---|---|
| 2004/0000400 A1* | 1/2004 | Fujisawa ............... E21B 49/005 |
| | | 166/264 |
| 2004/0007665 A1 | 1/2004 | DiFoggio et al. |
| 2008/0173804 A1* | 7/2008 | Indo ....................... G01N 21/64 |
| | | 250/269.1 |
| 2008/0173805 A1 | 7/2008 | Indo et al. |
| 2011/0180725 A1 | 7/2011 | Uchiyama et al. |
| 2013/0340518 A1 | 12/2013 | Jones et al. |
| 2021/0201178 A1* | 7/2021 | Fanini ..................... E21B 47/10 |

OTHER PUBLICATIONS

International Search Report & Written Opinion in International Application No. PCT/US2023/030256, mailed Dec. 5, 2023; 10 pages.

Chen et al., A Linear Time Algorithm for High Quality Mesh Simplification, IEEE, 2004, 8 pp.

Steffens et al., Application of Fluroscence to the Study of Crude Petroleum, Journal of Fluorescence, United States of America, May 2011, 7 pp.

Rostampour et al., Quantitative techniques to discriminate petroleum oils using LED-induced fluorescence, Water Pollution VIII: Modelling, Monitoring and Management, 2006, 8 pp.

\* cited by examiner

FLUORESCENCE SPECTROSCOPY FOR ESTIMATION OF FLUID CONTAMINATION

BACKGROUND

Borehole drilling is utilized in a number of applications, including exploration and production of natural gases and fluids, mineral extraction, gas storage, waste disposal, carbon dioxide sequestration, geothermal production and others. For example, in hydrocarbon exploration and production operations, boreholes are drilled deep into the earth to access hydrocarbon-bearing formations.

SUMMARY

An embodiment of a method of analyzing a fluid includes acquiring a sample of the fluid extracted from a subterranean region proximate to a borehole, the borehole including an injected fluid, applying light having a first excitation wavelength to the fluid sample, and measuring a first fluorescence spectrum. The method also includes comparing the first fluorescence spectrum to a reference fluorescence spectrum corresponding to a fluid having injected fluid contamination and/or to a second fluorescence spectrum based on applying light having a second excitation wavelength to the fluid sample. The method further includes estimating a level of contamination of the fluid sample with the injected fluid based on the comparing.

An embodiment of a system for analyzing a fluid includes a sampling device disposed at a borehole string and configured to extract a sample of the fluid from a subterranean region proximate to a borehole, and a spectroscopy device disposed at the borehole string and configured to receive the sample, the spectroscopy device including a fluorescence spectroscopy unit configured to apply light having a first excitation wavelength to the fluid sample. The system also includes a processing device configured to measure a first fluorescence spectrum indicative of a spectral response of the fluid sample to the first wavelength, and compare the first fluorescence spectrum to a reference fluorescence spectrum corresponding to a fluid having injected fluid contamination and/or a second fluorescence spectrum based on applying light having a second excitation wavelength to the fluid sample by the spectroscopy device. The processing device also includes estimating a level of contamination of the fluid sample with the injected fluid based on the comparing.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
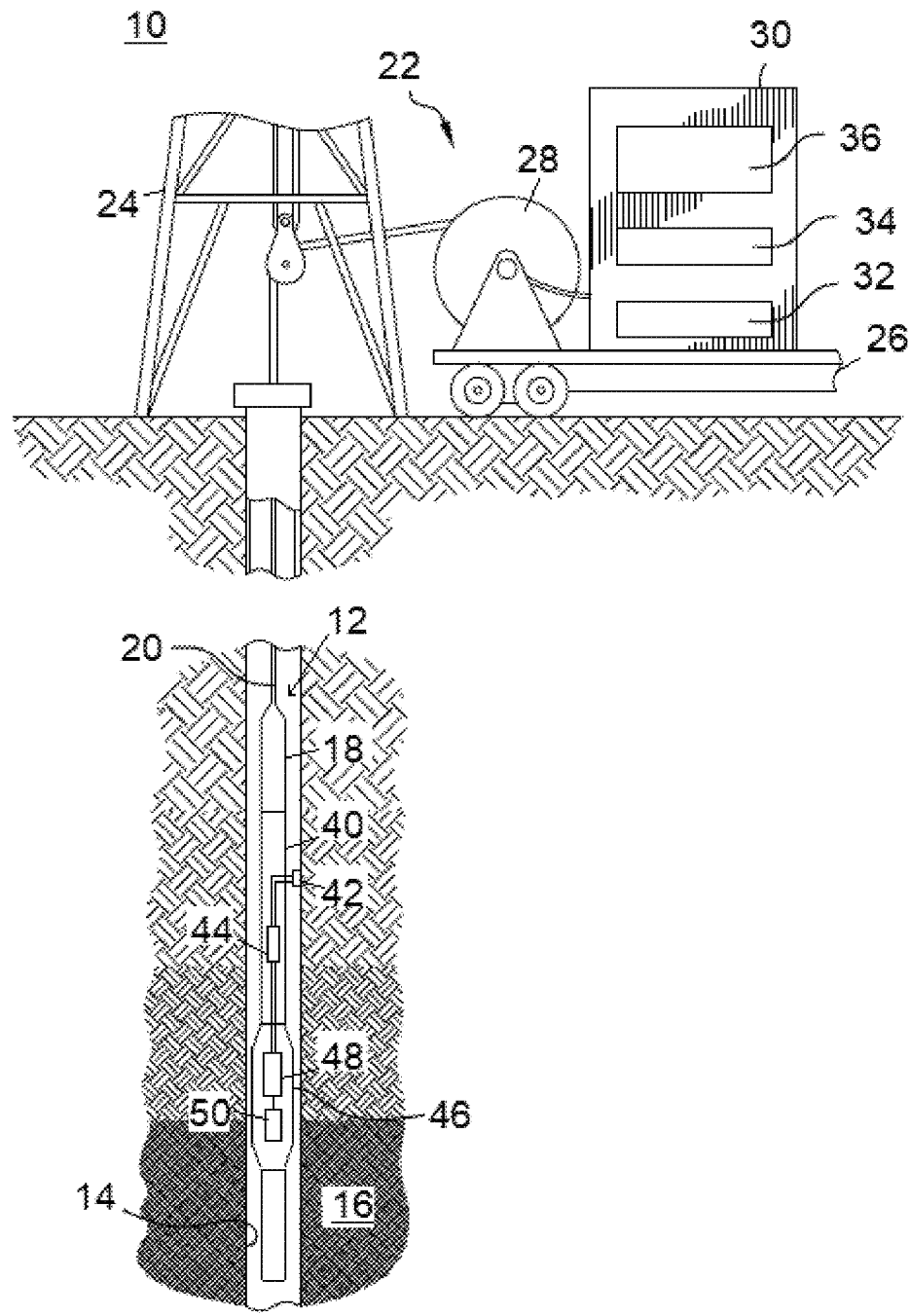
FIG. 1 depicts an embodiment of a system configured for performing subterranean operations, such as sampling and/or measurement operations.

Systems and methods are provided for interpreting fluid data derived from fluorescence measurements of a fluid extracted from a subterranean region. An embodiment of a fluid analysis system is configured to analyze fluorescence data and estimate an amount or level of contamination of an extracted fluid (e.g., formation fluid) with an injected fluid such as drilling mud. The level of contamination may be estimated as a proportion, concentration or other suitable measure. A "formation fluid" or "extracted fluid" refers to any fluid or combination of fluids that are in a hydrocarbon-bearing formation or other region, and is not limited to fluid from any specific type of region or formation. Formation fluids can include various combinations of hydrocarbons (e.g., oil and/or gas), non-hydrocarbon gases, water and others.

In an embodiment, the fluid analysis system is configured to estimate a level of contamination based on a wavelength shift in a measured fluorescence spectrum (i.e., a fluorescence spectrum of a fluid sample). For example, the level of contamination is estimated based on an amount or magnitude of a blue shift of a peak in a measured fluorescence spectrum as compared to a reference spectrum (e.g., a fluorescence spectrum associated with an uncontaminated formation fluid sample).

The fluid analysis system may also estimate contamination levels by comparing fluorescence spectra derived from measurements of a fluid sample using different excitation wavelengths. In an embodiment, the fluid analysis system is configured to measure a first fluorescence spectrum of a fluid sample by irradiating the fluid sample with light or radiation having a first selected wavelength (e.g., 385 nanometers or nm), and measure a second fluorescence spectrum of the fluid sample by irradiating the fluid sample with light or radiation having a second selected wavelength (e.g., 405 nm). A first intensity ratio is calculated by selecting a first intensity value and a second intensity value from the first fluorescence spectrum. The intensity values may be selected based on locations of peaks in the spectrum. A ratio of the intensity values (a first intensity ratio) is calculated. Similarly, a second intensity ratio is calculated based on intensity values selected from the second fluorescence spectrum. A difference between the first and second intensity ratios is calculated, and is correlated with a contamination level (e.g., percentage of injected fluid in the fluid sample) or otherwise used to estimate the contamination level.

Embodiments described herein present numerous advantages and technical effects. The embodiments provide an efficient method to evaluate fluid samples, which allows for collection of higher quality fluid samples as compared to conventional fluid sampling processes. Such samples improve formation fluid measurements and data quality, leading to improved evaluation of reservoirs and associated planning of operations (e.g., drilling, stimulation, etc.).

For example, contamination prediction or estimation is typically performed using density sensors. Embodiments described herein can reduce stationary time for sample collection as compared to typical methods, as well as improve the accuracy of contamination estimations at various contamination levels, including low contamination levels. A "low" contamination level is a level at which a mass percentage of the injected fluid in a sample is at or below about 10%, or is at or below about 5%.

FIG. 1 shows an embodiment of a system 10 for performing a subterranean operation (e.g., measurement, survey, drilling, stimulation and/or production). The system 10 includes a borehole string 12 that is shown disposed in a well or borehole 14 that penetrates a subterranean region 16 (including, for example, at least one earth formation). In an embodiment, the borehole string 12 is a wireline string that includes a string assembly such as a wireline tool string 18 configured to be deployed in the borehole via a cable 20. The cable 20 may be an armored cable or other structure and include one or more conductors (e.g., wires and/or optical fiber) for communicating with surface equipment 22.

The borehole 14 can be at least partially filled with a liquid or fluid that is injected and/or circulated in the borehole 14, and is referred to herein as an "injected fluid." In an embodiment, the injected fluid includes a fluid suspension known in the art as "drilling mud." It is noted that description of injected fluid and drilling mud is not intended to be limiting as to specific fluid formulations.

The surface equipment 22 includes a drilling rig 24 and a wireline rig 26. The wireline rig 26 includes a spool or drum 28 connected to a surface control unit 30. The surface control unit 30 can perform functions such as controlling deployment and retrieval of the tool string 18, communicating via a telemetry system, collecting data, analyzing data, transmitting data and/or analysis to a remote location, and others. For example, the surface control unit 30 includes a telemetry unit 32, a control unit 34 for deploying the tool string 18, and a data collection and analysis unit 36.

The system 10 and the borehole string 12 are not limited to wireline. For example, the borehole string 12 can be a production string (e.g., including coiled tubing or pipe), drill string or other type of string that can be disposed in the borehole 14.

In an embodiment, the tool string 18 includes a sampling tool 40 configured to extract a sample of formation fluid from the subterranean region 16. The sampling tool 40 includes an extraction device 42 configured to extend laterally and form an enclosed volume about a portion of a wall of the borehole 14. By reducing pressure inside the volume, a sample of the formation fluid can be extracted into the volume. The sampling tool 40 may include one or more containers 44 that serve as a fluid source for downhole spectroscopy or may be retrieved at the surface for analysis. The sampling tool 40 may be connected to a spectroscopy tool 46 that includes one or more measurement cells 48. It is noted that the sampling tool 40 and the spectroscopy tool 46 may be multiple tools as shown, or incorporated as a single tool or component.

In an embodiment, the tool string 18 includes a spectroscopy tool 46 for analysis as described herein. The spectroscopy tool 46 includes a measurement cell 48 that houses one or more light sources and at least one light detector. A fluid sample is directed to the measurement cell 48 and in contact with a window through which a fluid sample is illuminated. Measurements from the detector(s) are transmitted to an analysis unit 50 and/or to the surface control unit 30. The analysis unit 50 includes a processor, a memory (volatile and/or non-volatile memory) and other components to facilitate analyzing and/or storing data. Collected data and/or analysis results may be transmitted to the surface via the cable 20.

Figure 2:
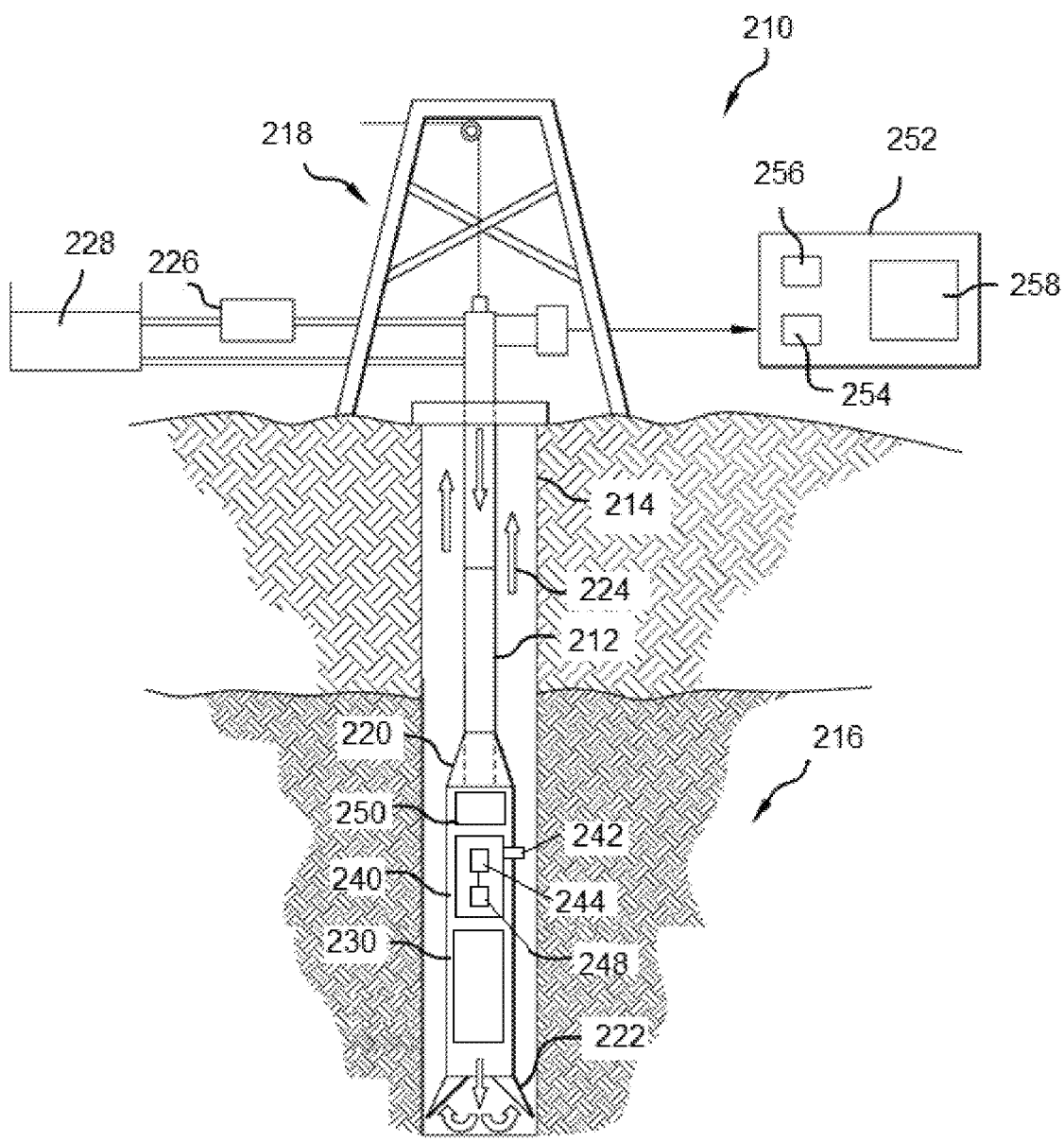
FIG. 2 depicts an embodiment of a system configured for performing subterranean operations, such as drilling, sampling and/or measurement operations.

As noted above, the embodiments are not limited to wireline and can be used in conjunction with any suitable borehole string and system, such as a drill string. FIG. 2 shows an embodiment of a system 210 for performing a drilling operation, which may be configured for fluid sampling and/or analysis. The system 210 includes a drill string 212 disposed in a well or borehole 214 that penetrates at least one earth formation 216. In an embodiment, the drill string 212 is connected to a bottomhole assembly (BHA) 220. The BHA 220 includes a drill bit 222.

The drill string 212 is operably connected to a surface structure or surface equipment 218 such as a drill rig, which includes or is connected to various components such as a surface drive or rotary table for supporting the borehole string 212, rotating the drill string 212 and lowering string sections or other downhole components. The drill string 212 may be driven from the surface, or may be driven from downhole, e.g., by a downhole mud motor (not shown).

The surface equipment 218 includes components to facilitate circulating fluid 224 such as drilling mud through the drill string 212 and an annulus between the drill string 212 and the borehole wall. For example, a pumping device 226 is located at the surface to circulate the fluid 224 from a mud pit or other fluid source 228.

The system 210 may include one or more of various tools configured to perform selected functions downhole such as performing downhole measurements and facilitating communications. For example, one or more downhole tools 230 may be included for performing measurements such as logging while drilling (LWD) or measurement while drilling (MWD) measurements. Examples of tools 230 include formation evaluation tools such as a gamma tool, a resistivity tool, a sampling tool, a density tool, a nuclear magnetic resonance tool, and/or an acoustic tool. Other examples include tools for measuring directional parameters.

In an embodiment, the drill string 212 and/or the BHA 220 includes a sampling and/or spectroscopy tool 240 configured to extract a sample of formation fluid, which includes a laterally extendable extraction device 242 for extracting samples of the formation fluid. The sampling and/or spectroscopy tool 240 may include one or more measurement cells 248, and may include one or more containers 244 that serve as a fluid source for downhole spectroscopy or may be retrieved at the surface for analysis. Each measurement cell 248 houses one or more light sources and at least one light detector. A fluid sample may be directed to the measurement cell 248 (e.g., directly from the extraction device 242 or via the one or more containers 244) and in contact with a window through which a fluid sample is illuminated. Measurements from the detector(s) may be transmitted to an analysis unit 250 and/or a surface processing unit 252 (e.g., a surface control unit). Sampling and spectroscopy components may be incorporated into a single tool as shown, or in multiple tools.

One or more downhole components and/or one or more surface components may be in communication with and/or controlled by a processing device or system, such as the surface processing unit 252. The surface processing unit 252, in one embodiment, includes an input/output (I/O) device 254, a processor 256, and a data storage device 258 (e.g., memory, computer-readable media, etc.) for storing data, models and/or computer programs or software that cause the processor to perform aspects of methods and processes described herein.

A processing device or processor, such as the analysis unit 50 or the data collection and analysis unit 36 (or the analysis unit 250 or the surface processing unit 252), is configured to receive fluid measurement data corresponding to detection of fluoresced light, and estimate fluid properties therefrom. In an embodiment, the fluid properties include a level of contamination of a formation fluid.

The level of contamination, in an embodiment, is estimated by comparing fluorescence spectra, which may include at least one measured fluorescence spectrum of a fluid sample and/or a reference spectrum of a reference fluid. A fluorescence spectrum represents the intensity of fluoresced light as a function of the wavelength of the fluoresced light (emitted wavelength). As discussed further herein, a level of contamination is estimated by calculating a wavelength shift as compared to a reference spectrum, and/or based on intensity ratios derived from fluorescence measurements of a fluid sample using at least two different excitation wavelengths.

In an embodiment, a wavelength shift of a measured fluorescence spectrum is calculated based on comparing the measured fluorescence spectrum to a reference spectrum indicative of a fluorescent response of a reference fluid (e.g., crude oil) that is not contaminated with an injected fluid. A peak of the measured spectrum is identified, along with the corresponding wavelength. A corresponding peak in the reference spectrum is identified. The wavelength of the measured peak is compared to the wavelength of the reference peak to determine a difference between the wavelengths (i.e., spectral shift or wavelength shift). The wavelength shift can be used to determine whether there is contamination and/or a level of contamination.

The wavelength shift can be used to estimate an amount or level of contamination based on a magnitude of the shift. Higher levels of contamination (i.e., higher proportions of drilling mud or other injected fluid) correspond to larger wavelength shifts).

Figure 3:
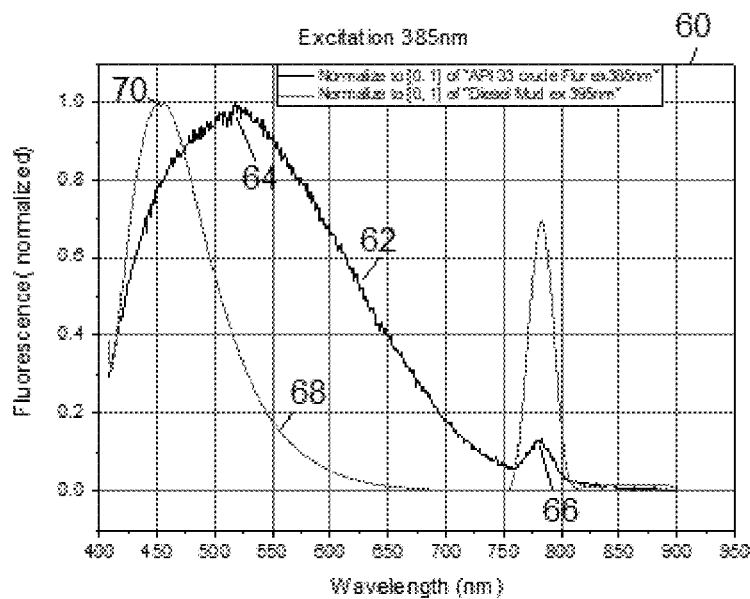
FIG. 3 depicts fluorescence spectra of fluid samples in response to a first excitation wavelength.
Figure 4:
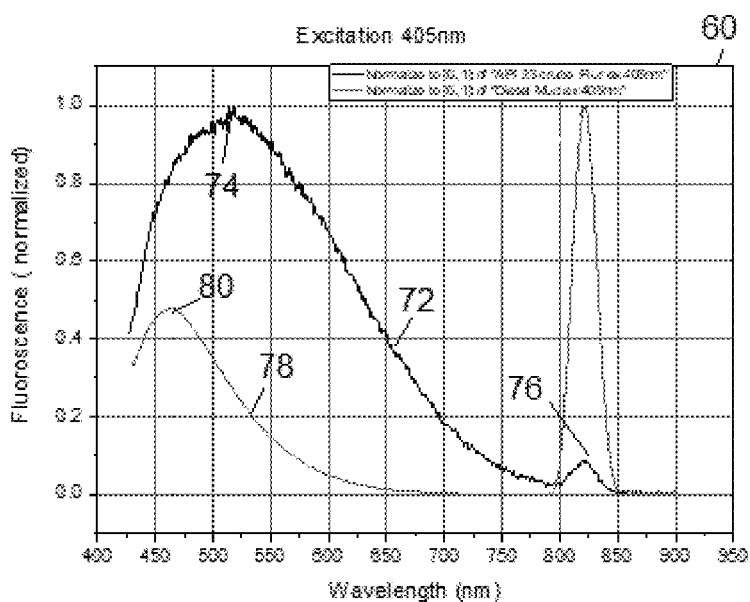
FIG. 4 depicts fluorescence spectra of the fluid samples of FIG. 3 in response to a second excitation wavelength.

FIGS. 3 and 4 show examples of reference fluorescence spectra that may be used to estimate contamination levels. The fluorescence spectra are shown as plots of fluorescence intensity (in normalized units) as a function of emitted wavelength. Light having selected wavelengths was applied to an uncontaminated formation fluid to generate the reference spectra. In these examples, the uncontaminated formation fluid is light crude oil having an American Petroleum Institute (API) gravity of 33.

Fluorescence spectra measured for an injected fluid are also shown. In these examples, the injected fluid is a diesel based drilling mud.

FIG. 3 depicts a graph 60 that includes a reference spectrum 62 of a spectral response of the uncontaminated formation fluid to an excitation wavelength of 385 nanometers (nm). The reference spectrum 62 has a peak 64 at around 520 nm, and a peak 66 at around 780 nm.

The graph 60 includes an injected fluid spectrum 68 showing a response of the injected fluid to the 385 nm excitation wavelength. As shown, the injected fluid spectrum 68 has a peak 70 at around 450 nm. Thus, the fluorescence of the injected fluid is blue shifted, i.e., the peak 70 is shifted toward shorter wavelengths as compared to the peak 64.

FIG. 4 depicts the graph 60 with spectral responses of the uncontaminated formation fluid and the injected fluid to an excitation wavelength of 405 nm. The responses are represented by a reference spectrum 72 of a spectral response of uncontaminated fluid. The reference spectrum 72 has a peak 74 at around 520 nm, and a peak 76 at around 825 nm. The graph 60 in this example includes an injected fluid spectrum 78 showing a response of the injected fluid to the 405 nm excitation wavelength, which has a peak 80 at around 470 nm. The injected fluid response is also blue shifted as shown.

Such a blue shift occurs at least because the injected fluid has a narrow carbon band with lighter hydrocarbons (e.g., C1-C20), whereas the formation fluid has a wider carbon band (e.g., C1-C40) with heavier hydrocarbons.

Figure 5:
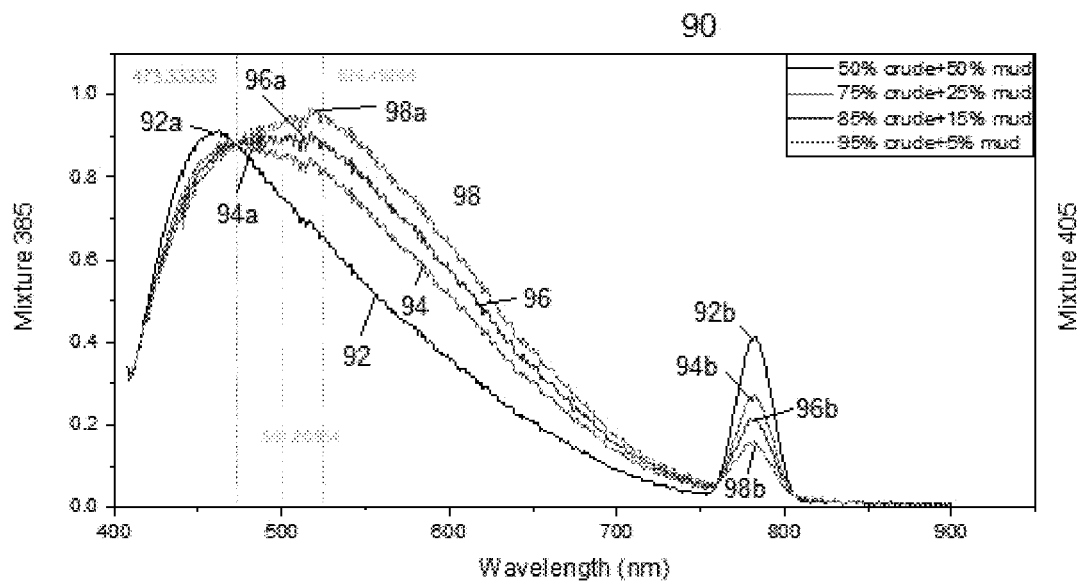
FIG. 5 depicts fluorescence spectra of formation fluid samples having varying levels of contamination, in response to a first excitation wavelength.
Figure 6:
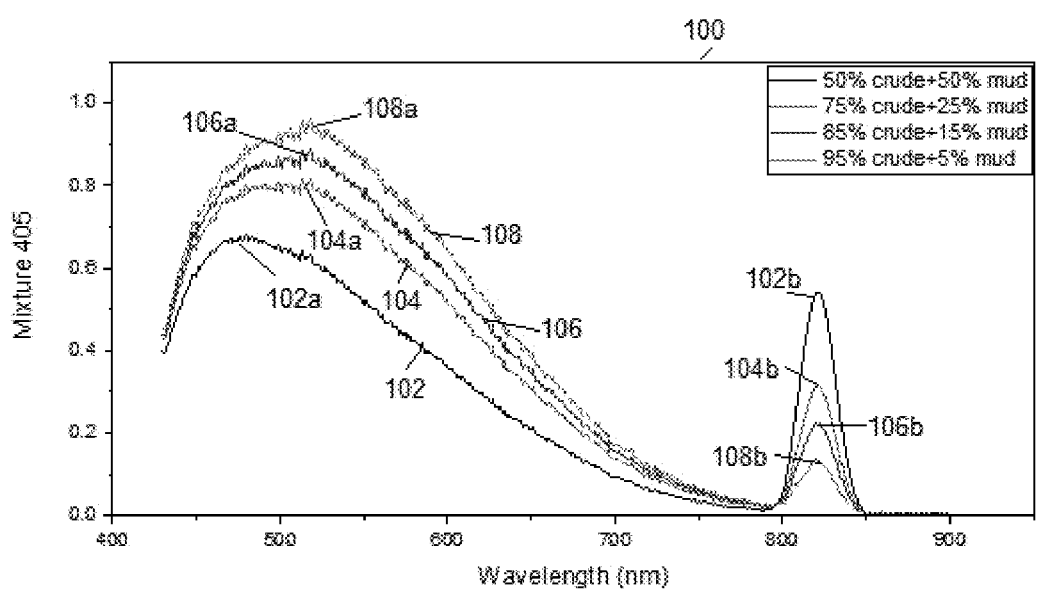
FIG. 6 depicts fluorescence spectra of the formation fluid samples of FIG. 5, in response to a second excitation wavelength.

FIGS. 5 and 6 show examples of fluorescence spectra of fluids having different levels of contamination. FIG. 5 shows spectra at various contamination levels in response to a 385 nm excitation wavelength, and FIG. 6 shows spectra at various contamination levels in response to a 405 nm excitation wavelength. FIGS. 5 and 6 illustrate how a peak wavelength of the fluorescence response blue shifts with increasing levels of contamination.

Referring to FIG. 5, a fluorescence spectrum 92 represents a response of a fluid sample having 50% formation fluid and 50% injected fluid (i.e., a contamination level of 50%). The fluorescence spectrum 92 includes a peak 92a at around 425 nm, and a peak 92b at around 780 nm.

A fluorescence spectrum 94 represents a response of a fluid sample having 75% formation fluid and 25% injected fluid (i.e., a contamination level of 25%). The fluorescence spectrum 94 includes a peak 94a at around 480 nm, and a peak 92b at around 780 nm. As can be seen, the sample with higher contamination has a peak (peak 92a) that is blue shifted as compared to the sample with lower contamination (peak 94a).

A fluorescence spectrum 96 represents a response of a fluid sample having a contamination level of 15%, which includes a peak 96a at around 510 nm and a peak 96b at around 780 nm. A fluorescence spectrum 98 represents a response of a fluid sample having a contamination level of 5%, which includes a peak 98a at around 520 nm and a peak 98b at around 780 nm.

Referring to FIG. 6, a fluorescence spectrum 102 represents a response of a fluid sample having a contamination level of 50%, which includes a peak 102a at around 480 nm and a peak 102b at around 820 nm. A fluorescence spectrum 104 represents a response of a fluid sample having a contamination level of 25%, which includes a peak 104a at around 520 nm and a peak 104b at around 820 nm.

A fluorescence spectrum 106 represents a response of a fluid sample having a contamination level of 15%, and includes a peak 106a at around 520 nm, and a peak 106b at around 820 nm. A fluorescence spectrum 108 represents a response of a fluid sample having a contamination level of 5%, and includes a peak 108a at around 520 nm, and a peak 108b at around 820 nm.

In an embodiment, a processing device (e.g., the analysis unit 50 or the data collection and analysis unit 36, or the analysis unit 250 or the surface processing unit 252) is configured to estimate a contamination level based on fluorescence spectra taken by irradiating a fluid sample with at least two different excitation wavelengths. The fluorescence spectra are compared to one another to estimate a contamination level.

For example, the processing device acquires a first fluorescence spectrum of a sample irradiated with a first excitation wavelength, and selects two intensity values, referred to as a "first intensity value" and a "second intensity value." The intensity values may correspond to each of two peaks in the first fluorescence spectrum. A "first intensity ratio" is calculated as a ratio of the first intensity value to the second intensity value.

A second fluorescence spectrum is also acquired by irradiating the same sample with a second excitation wavelength to generate a second fluorescence spectrum. Two intensity values, referred to as a "third intensity value" and a "fourth intensity value," are selected (e.g., based on respective peaks in the second fluorescence spectrum). A "second intensity ratio" is calculated as a ratio of the third intensity value to the fourth intensity value.

The intensity values of a fluorescence spectrum may be values at any two wavelengths of the spectrum. For example, the intensity values may be values at wavelengths at which peaks occur in the fluorescence spectrum. Alternatively, the wavelength values may correspond to peaks of a spectrum for an uncontaminated fluid irradiated with the same excitation wavelength. It is noted that the more than two intensity values may be selected.

The first intensity ratio is compared to the second intensity ratio to determine a difference therebetween. This "intensity ratio" difference can be correlated with a contamination level, e.g., via look-up table, curve of differences as a function of contamination or other data.

An example of determining an intensity ratio difference is discussed with reference to fluorescence spectra 92 and 102 show in FIGS. 5 and 6. As noted above, the spectrum 92 represents a fluid sample response to an excitation wavelength of 385 nm. The spectrum 102 represents the fluid sample response to an excitation wavelength of 405 nm.

Two intensity values are selected from the spectrum 92. For example, a first intensity value is selected at 518 nm from the spectrum 92, which is the wavelength at which the initial peak 64 of the reference spectrum 62 occurs. A second intensity value is selected at 783 nm, which is the wavelength of the peak 66 of the reference spectrum 62. A ratio of these intensity values is calculated to generate a first intensity ratio.

Similarly, two intensity values are selected from the spectrum 102. For example, a third intensity value is selected at 510 nm, which is the wavelength at which the initial peak 74 of the reference spectrum 72 occurs. A fourth intensity value is selected at 822 nm, which is the wavelength at another peak 76 of the reference spectrum 72. A ratio of these intensity values is calculated to generate a second intensity ratio.

The difference between the first intensity ratio and the second intensity ratio is calculated. The intensity ratio difference is correlated with an amount of injected fluid in the sample, i.e., level of contamination.

Figure 7:
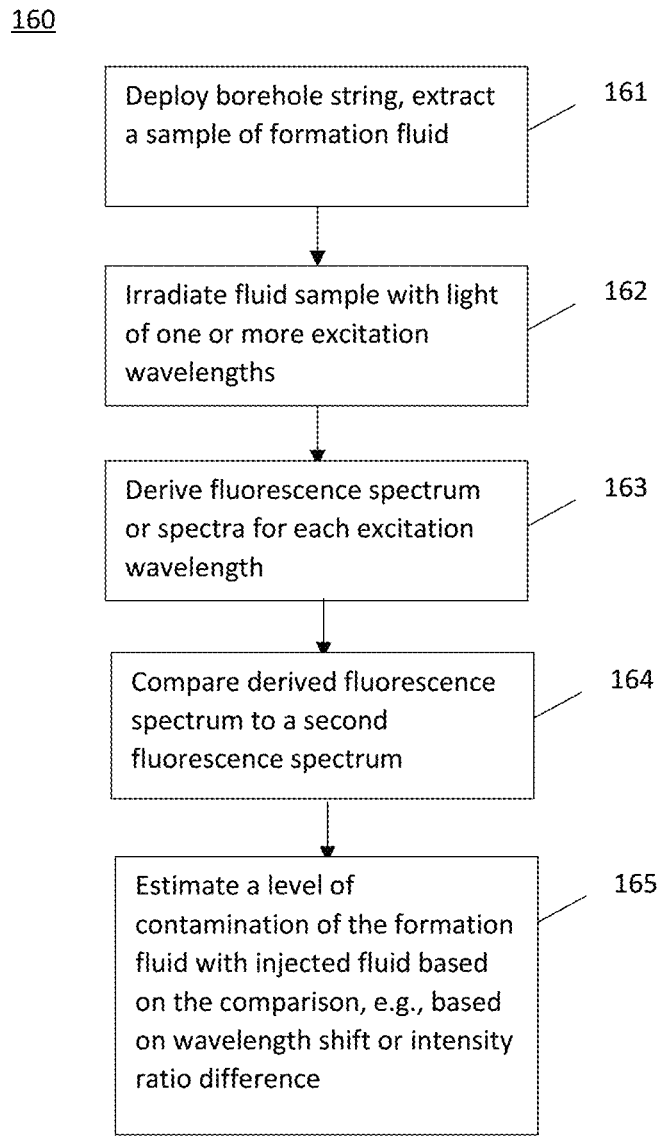
FIG. 7 is a flow diagram depicting an embodiment of a method of analyzing a fluid sample acquired from a subterranean region.

FIG. 7 illustrates a method 160 of analyzing a fluid. The method 160 includes one or more of stages 161-165 described herein, at least portions of which may be performed by a processor (e.g., the analysis unit 50 or 250). In one embodiment, the method 160 includes the execution of all of stages 161-165 in the order described. However, certain stages may be omitted, stages may be added, or the order of the stages changed.

The method 160 may be performed at various times and under various conditions. For example, the samples can be analyzed downhole on a real time basis (e.g., as samples are collected or otherwise during an operation), analyzed downhole at other times, and/or retrieved and analyzed at the surface.

In the first stage 161, a borehole string (e.g., the borehole string 12 or drill string 212) is deployed into a borehole, and one or more samples of formation fluid are acquired. For example, the borehole string 12 is deployed in the borehole 14, and one or more samples of formation fluid are extracted via the sampling tool 40.

In the second stage 162, a fluid sample is irradiated with light having one or more selected excitation wavelengths. For example, a fluid sample is flowed to the measurement cell 48, or flowed to the measurement cell 248. The sample is irradiated with a first excitation wavelength (e.g., 385 nm) and fluorescence measurements are recorded.

In another example, the sample is irradiated with the first excitation wavelength and measurements are recorded. The sample is then irradiated with a second excitation wavelength (e.g., 405 nm) and measurements are recorded.

In the third stage 163, at least one fluorescence spectrum is derived from the recorded measurements. For example, recorded measurements are used to generate a first fluorescence spectrum indicating a response of the fluid sample to the first excitation wavelength.

In another example, recorded measurements are used to generate the first fluorescence spectrum. In addition, recorded measurements are used to generate a second fluorescence spectrum indicating a response of the fluid sample to the second excitation wavelength.

In the fourth stage 164, the first fluorescence spectrum is compared to another fluorescence spectrum, which may be the second fluorescence spectrum or a reference fluorescence spectrum. In an embodiment, the first fluorescence spectrum is compared to a reference spectrum such as a fluorescence spectrum of a response of a reference fluid (e.g., crude oil) to the first excitation wavelength. For example, the wavelength at which a peak occurs in the first fluorescence spectrum is compared to a wavelength at which a peak occurs in the reference spectrum, and a difference therebetween is calculated as a wavelength shift.

In an embodiment, two intensity values are selected from the first fluorescence spectrum (e.g., intensity values at peaks, or intensity values at wavelengths corresponding to peaks in a reference spectrum). A first intensity ratio is calculated between these intensity values. Two intensity values are also selected from the second fluorescence spectrum, and a second intensity ratio is calculated. An intensity ratio difference is calculated as a difference between the first intensity ratio and the second intensity ratio.

In the fifth stage 165, results of the comparison are used to estimate a level of contamination. In an embodiment, the magnitude of the wavelength shift is correlated with an amount of injected fluid in the sample (e.g., as a concentration or percentage). In addition, or alternatively, the intensity ratio difference is correlated with the amount of injected fluid. The amount (i.e., level of contamination) may be determined by consulting a look-up table, curve or other data that correlates shift magnitudes and/or intensity ratio differences with levels of contamination.

Various actions can be performed based on estimation of contamination levels. Examples of actions include retaining or rejecting samples based on contamination level, collecting samples and performing fluid analysis of the samples. Other examples include presenting results to a user or operator, and planning and/or adjusting an operation based on information acquired as a result of contamination level estimations.

Figure 8:
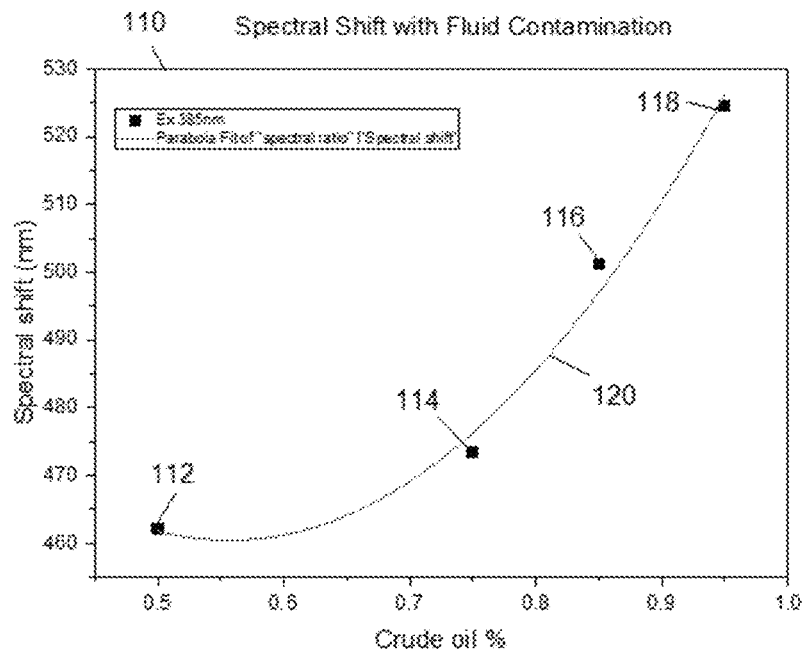
FIG. 8 is a graph of spectral shift as a function of contamination level.

FIG. 8 depicts an example of a curve representing the wavelength of a fluorescence peak as a function of contamination level. This curve may be used to estimate or predict contamination level.

In this example, a graph 110 shows the spectral response of fluid samples at varying contamination levels to an excitation wavelength of 385 nm. A point 112 corresponds to the wavelength of a peak for a sample with a 50% contamination level (e.g., the peak 92a), and a point 114 corresponds to the wavelength of a peak for a sample with a 25% contamination level (e.g., the peak 94a). A point 116 corresponds to the wavelength of a peak for a sample with an 85% contamination level (e.g., the peak 96a), and a point 118 corresponds to a peak for a sample with a 5% contamination level (e.g., the peak 98a). The points are fit to a parabolic curve 120 representing the relationship between wavelength shift and contamination.

Figure 9:
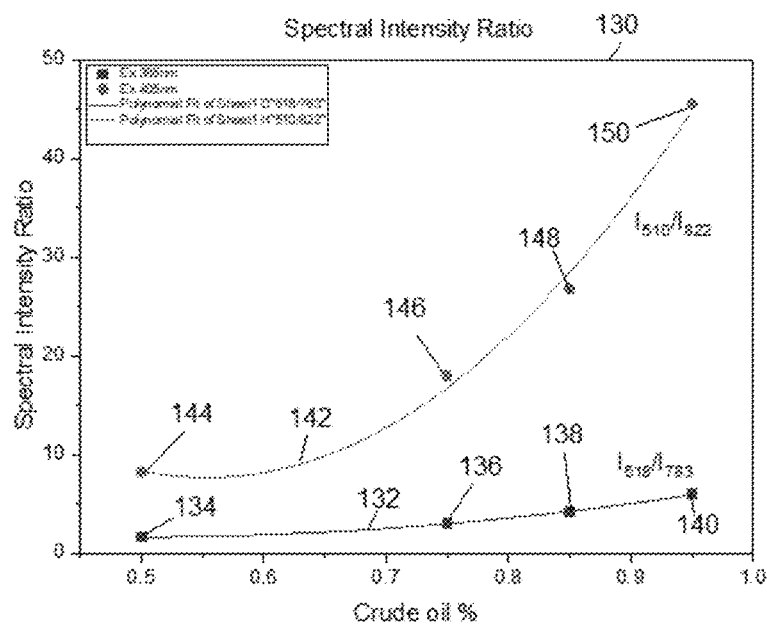
FIG. 9 is a graph of intensity ratios derived from fluorescence spectra of fluid samples.

FIG. 9 shows an example of intensity ratio differences and associated levels of contamination, which may be used to estimate or predict contamination level. The intensity ratio differences are derived from fluorescence spectra of fluid samples irradiated with two wavelengths, i.e., 385 nm and 405 nm.

A graph 130 includes an intensity ratio curve 132 for samples irradiated with 385 nm light. The curve is derived from intensity ratios represented by data points 134, 136, 138 and 140. Each intensity ratio ($I_{518}/I_{783}$) is a ratio of intensity at a wavelength of 518 nm ($I_{518}$) to intensity at a wavelength of 783 nm ($I_{783}$).

An intensity ratio curve 142 is also shown for samples irradiated with 405 nm light. The curve 142 is derived from intensity ratios represented by data points 144, 146, 148 and 150. Each intensity ratio ($I_{510}/I_{822}$) is a ratio of intensity at a wavelength of 510 nm ($I_{510}$) to intensity at a wavelength of 822 nm ($I_{822}$). As shown, as contamination level decreases (i.e., percentage of formation fluid or crude oil in the sample increases), the difference between $I_{518}/I_{783}$ and $I_{510}/I_{822}$ increases.

Set forth below are some embodiments of the foregoing disclosure:

Embodiment 1: A method of analyzing a fluid, comprising: acquiring a sample of the fluid extracted from a subterranean region proximate to a borehole, the borehole including an injected fluid; applying light having a first excitation wavelength to the fluid sample, and measuring a first fluorescence spectrum; comparing the first fluorescence spectrum to at least one of: a reference fluorescence spectrum corresponding to a fluid having injected fluid contamination, and a second fluorescence spectrum based on applying light having a second excitation wavelength to the fluid sample; and estimating a level of contamination of the fluid sample with the injected fluid based on the comparing.

Embodiment 2: The method as in any prior embodiment, wherein the level of contamination corresponds to at least one of a proportion, percentage and concentration of the injected fluid in the fluid sample.

Embodiment 3: The method as in any prior embodiment, wherein the fluid sample is acquired by sampling the fluid from a borehole, and the estimating is performed when the fluid sample is downhole.

Embodiment 4: The method as in any prior embodiment, wherein the fluid sample is acquired and the level of contamination is estimated in real time during a subterranean operation.

Embodiment 5: The method as in any prior embodiment, wherein comparing the first fluorescence spectrum to the reference fluorescence spectrum includes identifying a first peak in the first fluorescence spectrum, identifying a second peak in the reference fluorescence spectrum, and estimating a wavelength shift between the first peak and the second peak.

Embodiment 6: The method as in any prior embodiment, wherein the level of contamination is estimated based on a magnitude of the wavelength shift.

Embodiment 7: The method as in any prior embodiment, wherein comparing the first fluorescence spectrum to the second fluorescence spectrum includes identifying a first peak and a second peak of the first fluorescence spectrum, and estimating a first ratio of an intensity of the first peak to an intensity of the second peak.

Embodiment 8: The method as in any prior embodiment, wherein comparing the first fluorescence spectrum to the second fluorescence spectrum includes identifying a third peak and a fourth peak of the second fluorescence spectrum, and estimating a second ratio of an intensity of the third peak to an intensity of the fourth peak.

Embodiment 9: The method as in any prior embodiment, wherein comparing the first fluorescence spectrum to the second fluorescence spectrum includes calculating a difference between the first ratio and the second ratio.

Embodiment 10: The method as in any prior embodiment, wherein the amount of contamination is estimated based on the difference.

Embodiment 11: A system for analyzing a fluid, comprising: a sampling device disposed at a borehole string and configured to extract a sample of the fluid from a subterranean region proximate to a borehole; a spectroscopy device disposed at the borehole string and configured to receive the sample, the spectroscopy device including a fluorescence spectroscopy unit configured to apply light having a first excitation wavelength to the fluid sample, and a processing device configured to perform: measuring a first fluorescence spectrum indicative of a spectral response of the fluid sample to the first wavelength; comparing the first fluorescence spectrum to at least one of: a reference fluorescence spectrum corresponding to a fluid having injected fluid contamination, and a second fluorescence spectrum based on applying light having a second excitation wavelength to the fluid sample by the spectroscopy device; and estimating a level of contamination of the fluid sample with the injected fluid based on the comparing.

Embodiment 12: The system as in any prior embodiment, wherein the level of contamination corresponds to at least one of a proportion, percentage and concentration of the injected fluid in the fluid sample.

Embodiment 13: The system as in any prior embodiment, wherein the estimating is performed when the fluid sample is downhole.

Embodiment 14: The system as in any prior embodiment, wherein the fluid sample is acquired and the level of contamination is estimated in real time during a subterranean operation.

Embodiment 15: The system as in any prior embodiment, wherein comparing the first fluorescence spectrum to the reference fluorescence spectrum includes identifying a first peak in the first fluorescence spectrum, identifying a second peak in the reference fluorescence spectrum, and estimating a wavelength shift between the first peak and the second peak.

Embodiment 16: The system as in any prior embodiment, wherein the level of contamination is estimated based on a magnitude of the wavelength shift.

Embodiment 17: The system as in any prior embodiment, wherein comparing the first fluorescence spectrum to the second fluorescence spectrum includes identifying a first peak and a second peak of the first fluorescence spectrum, and estimating a first ratio of an intensity of the first peak to an intensity of the second peak.

Embodiment 18: The system as in any prior embodiment, wherein comparing the first fluorescence spectrum to the second fluorescence spectrum includes identifying a third peak and a fourth peak of the second fluorescence spectrum, and estimating a second ratio of an intensity of the third peak to an intensity of the fourth peak.

Embodiment 19: The system as in any prior embodiment, wherein comparing the first fluorescence spectrum to the second fluorescence spectrum includes calculating a difference between the first ratio and the second ratio.

Embodiment 20: The system as in any prior embodiment, wherein the amount of contamination is estimated based on the difference.

As used herein generation of data in "real time" is taken to mean generation of data at a rate that is useful or adequate for making decisions during or concurrent with processes such as production, experimentation, verification, and other types of surveys or uses as may be opted for by a user. It should be recognized that "near real time" is to be taken in context, and does not necessarily indicate the instantaneous determination of data, or make any other suggestions about the temporal frequency of data collection and determination.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof.

Therefore, it is intended that the invention not be limited to the particular embodiment disclosed as the best mode contemplated for carrying out this invention, but that the invention will include all embodiments falling within the scope of the appended claims.

What is claimed:

1. A method of analyzing a fluid, comprising:
   acquiring a sample of the fluid extracted from a subterranean region proximate to a borehole, the borehole including an injected fluid;
   applying light having a first excitation wavelength to the fluid sample, and measuring a first fluorescence spectrum;
   comparing the first fluorescence spectrum to at least one of: a reference fluorescence spectrum corresponding to a fluid having injected fluid contamination, and a second fluorescence spectrum based on applying light having a second excitation wavelength to the fluid sample; and
   estimating a level of contamination of the fluid sample with the injected fluid based on the comparing, wherein comparing the first fluorescence spectrum to the reference fluorescence spectrum includes identifying a first peak in the first fluorescence spectrum, identifying a second peak in the reference fluorescence spectrum, and estimating a wavelength shift between the first peak and the second peak.

2. The method of claim 1, wherein the level of contamination corresponds to at least one of a proportion, percentage and concentration of the injected fluid in the fluid sample.

3. The method of claim 1, wherein the fluid sample is acquired by sampling the fluid from a borehole, and the estimating is performed when the fluid sample is downhole.

4. The method of claim 1, wherein the fluid sample is acquired and the level of contamination is estimated in real time during a subterranean operation.

5. The method of claim 1, wherein the level of contamination is estimated based on a magnitude of the wavelength shift.

6. The method of claim 1, wherein comparing the first fluorescence spectrum to the second fluorescence spectrum includes identifying a first peak and a second peak of the first fluorescence spectrum, and estimating a first ratio of an intensity of the first peak to an intensity of the second peak.

7. The method of claim 6, wherein comparing the first fluorescence spectrum to the second fluorescence spectrum includes identifying a third peak and a fourth peak of the second fluorescence spectrum, and estimating a second ratio of an intensity of the third peak to an intensity of the fourth peak.

8. The method of claim 7, wherein comparing the first fluorescence spectrum to the second fluorescence spectrum includes calculating a difference between the first ratio and the second ratio.

9. The method of claim 8, wherein the amount of contamination is estimated based on the difference.

10. A system for analyzing a fluid, comprising:
    a sampling device disposed at a borehole string and configured to extract a sample of the fluid from a subterranean region proximate to a borehole;
    a spectroscopy device disposed at the borehole string and configured to receive the sample, the spectroscopy device including a fluorescence spectroscopy unit configured to apply light having a first excitation wavelength to the fluid sample, and a processor configured to perform:
    measuring a first fluorescence spectrum indicative of a spectral response of the fluid sample to the first wavelength;
    comparing the first fluorescence spectrum to at least one of: a reference fluorescence spectrum corresponding to a fluid having injected fluid contamination, and a second fluorescence spectrum based on applying light having a second excitation wavelength to the fluid sample by the spectroscopy device; and
    estimating a level of contamination of the fluid sample with the injected fluid based on the comparing, wherein comparing the first fluorescence spectrum to the reference fluorescence spectrum includes identifying a first peak in the first fluorescence spectrum, identifying a second peak in the reference fluorescence spectrum, and estimating a wavelength shift between the first peak and the second peak.

11. The system of claim 10, wherein the level of contamination corresponds to at least one of a proportion, percentage and concentration of the injected fluid in the fluid sample.

12. The system of claim 10, wherein the estimating is performed when the fluid sample is downhole.

13. The system of claim 10, wherein the fluid sample is acquired and the level of contamination is estimated in real time during a subterranean operation.

14. The system of claim 10, wherein the level of contamination is estimated based on a magnitude of the wavelength shift.

15. The system of claim 10, wherein comparing the first fluorescence spectrum to the second fluorescence spectrum includes identifying a first peak and a second peak of the first fluorescence spectrum, and estimating a first ratio of an intensity of the first peak to an intensity of the second peak.

16. The system of claim 15, wherein comparing the first fluorescence spectrum to the second fluorescence spectrum includes identifying a third peak and a fourth peak of the second fluorescence spectrum, and estimating a second ratio of an intensity of the third peak to an intensity of the fourth peak.

17. The system of claim 16, wherein comparing the first fluorescence spectrum to the second fluorescence spectrum includes calculating a difference between the first ratio and the second ratio.

18. The system of claim 17, wherein the amount of contamination is estimated based on the difference.

* * * * *